United States Patent [19]

Isaka et al.

[11] 4,230,767
[45] Oct. 28, 1980

[54] HEAT SEALABLE LAMINATED PROPYLENE POLYMER PACKAGING MATERIAL

[75] Inventors: Tsutomu Isaka; Maki Matsuo; Yukinobu Miyazaki, all of Inuyama, Japan

[73] Assignee: Toyo Boseki Kabushiki Kaisha, Japan

[21] Appl. No.: 10,641

[22] Filed: Feb. 8, 1979

[30] Foreign Application Priority Data

Feb. 8, 1978 [JP] Japan .................. 53-13932
Dec. 29, 1978 [JP] Japan ................. 53-165137

[51] Int. Cl.³ .................. B32B 27/32; B32B 31/16
[52] U.S. Cl. ................... 428/349; 156/229; 428/513; 428/516; 428/523
[58] Field of Search ............. 156/229; 428/910, 513, 428/516, 523, 347, 349

[56] References Cited

U.S. PATENT DOCUMENTS

| | | | |
|---|---|---|---|
| 2,872,347 | 2/1959 | Goland et al. ................ 428/347 |
| 2,928,756 | 3/1960 | Campbell ................... 428/516 X |
| 3,111,418 | 11/1963 | Gilbert et al. ............... 428/347 |
| 3,232,789 | 2/1966 | Pelzek et al. .............. 428/349 X |
| 3,285,766 | 11/1966 | Barkis et al. ................ 428/349 |
| 3,355,319 | 11/1967 | Rees ........................... 428/349 |
| 3,671,383 | 6/1972 | Sakata et al. ................. 428/349 |
| 3,887,745 | 6/1975 | Yoshii et al. ............... 428/516 X |
| 3,891,008 | 6/1975 | D'Entremont ............. 428/516 X |
| 4,147,827 | 4/1979 | Breidt et al. ............... 428/349 X |
| 4,151,318 | 4/1979 | Marshall .................... 156/229 X |
| 4,161,562 | 7/1979 | Yoshikawa et al. ......... 428/910 X |
| 4,169,910 | 10/1979 | Graboski ................... 428/516 X |
| 4,178,401 | 12/1979 | Weinberg et al. .......... 428/516 X |

*Primary Examiner*—Harold Ansher
*Attorney, Agent, or Firm*—Jones, Tullar & Cooper

[57] ABSTRACT

A packaging material having an excellent seal packaging property, which comprises (A) a base layer consisting of a stretched film made of a polymer composition comprising a propylene polymer and (B) a surface layer consisting of a stretched film made of a polymeric mixture comprising a polymer blend provided on at least one surface of said base layer, said polymer blend comprising a copolymer of ethylene and propylene and a copolymer of butene and any other polymerizable monomer having an ethylenic unsaturation in a weight proportion of 5:95 to 95:5.

51 Claims, 4 Drawing Figures

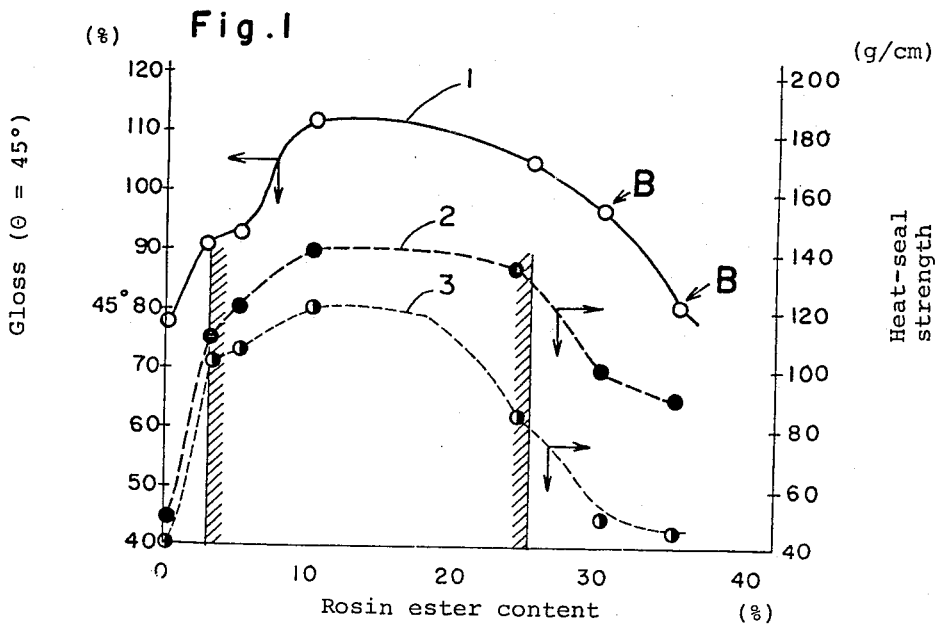
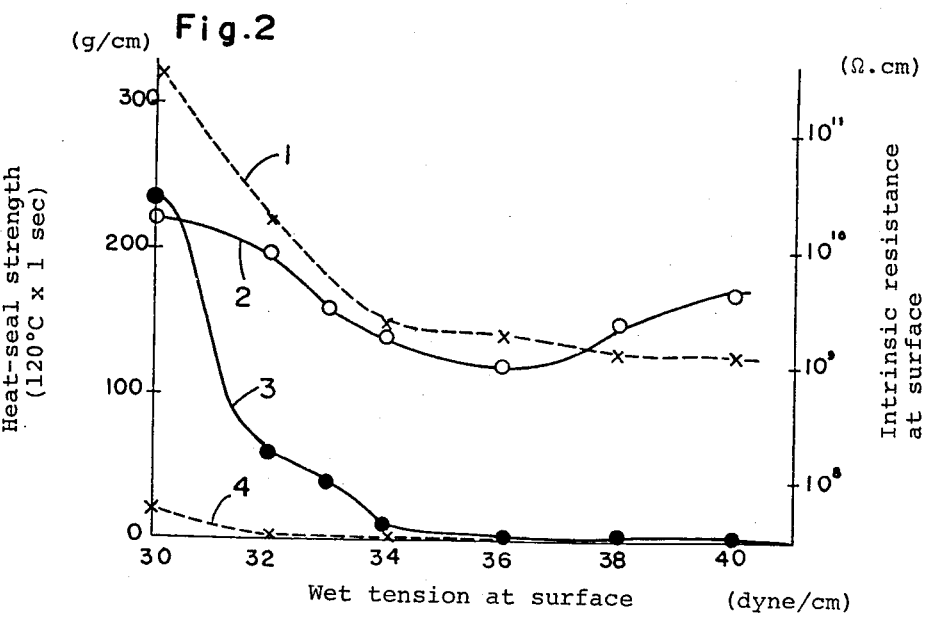

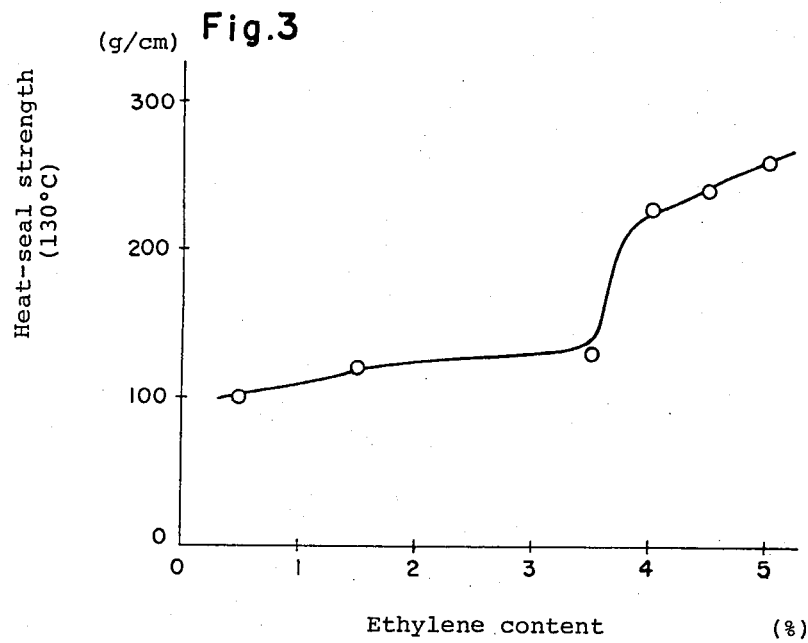
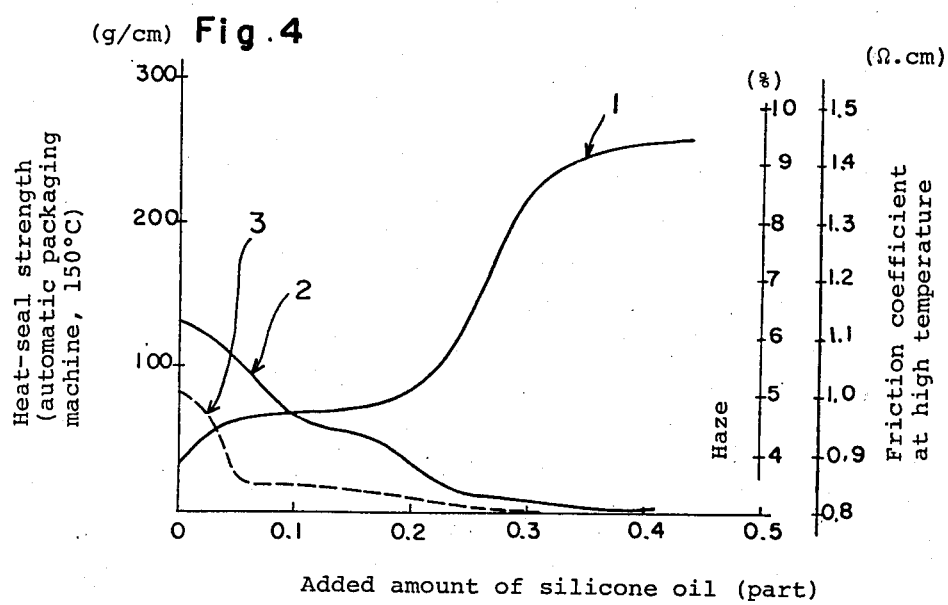

HEAT SEALABLE LAMINATED PROPYLENE POLYMER PACKAGING MATERIAL

The present invention relates to a packaging material and its production. More particularly, the invention relates to a packaging material having excellent physical properties such as heat stability at low temperature, high transparency and excellent gloss, and its production.

Characteristically, the packaging material of this invention has excellent sealability at low temperatures, slip or lubricity over a wide temperature range, separability from a hot plate, antistatic properties, etc., all of which are required when packaging articles by the use of an automatic packaging machine. Therefore, the packaging material of the invention is particularly useful for repackaging a single or multiple articles once packaged by the use of any other packaging material.

In recent years, highly advanced requirements have been made in external packaging of a variety of products such as foods, tobaccos, industrial goods and daily miscellaneous goods. In the package of foods, for example, materials for external packaging are required to be excellent in various properties such as low moisture premeability, fragrance-retention, insect proofness and low oxygen-permeability. It is also necessary that the packaging material forms an adequate heat seal with sufficient adhesion and air tightness at any piled portion caused by film wrinkling. Further, a bad odor caused by the packaging material is undesirable from the sanitary viewpoint, so that earnest effort has been made to decrease solvents remaining in the packaging material. On the other hand, automatic packaging machines have been operating at higher speed with higher efficiency. For use of packaging materials in such automatic packaging machines, therefore, the following properties are necessitated: (1) heat-sealability at low temperature, (2) lubricity between the packaging material and the metal guide portion of the automatic packaging machine, (3) separability and lubricity between the packaging machine and the hot plate, (4) flaw-preventing properties on sliding between the packaging material and the automatic packaging machine, (5) automatic suppliability of the packaging material to the automatic packaging machine, etc.

As packaging materials having a heat-seal property, there have been proposed (a) coating films obtained by applying a low melting point substance dissolved in an organic solvent to a base film, (b) single films obtained by admixing polypropylene with low melting point polymer, (c) laminated films obtained by laminating a low melting point polymer on a base film in such a manner that the said low melting point polymer layer forms the heat-seal surface, (d) single films obtained by admixing polypropylene with a low molecular weight thermoplastic resin, etc. However, the films obtained by the coating method are inferior in seal-strength at high temperature and unsuitable for seal-package according to the present invention. In addition, it is difficult to eliminate the remaining solvent on the coating surface completely. The films obtained by admixing polypropylene with a low melting point polymer are insufficient in seal property at low temperature, and the transparency and the gloss are apt to be decreased, the gloss being particularly inferior, compared with the film obtained by the coating method. Besides, the film is soft and its firmness and strength are small, so that continuous package by the aid of an automatic packaging machine is difficult. A process of lamination of a low melting point polymer on a base film has been also attempted. But, melt-adhesion to the roll or production of scratches on film surfaces are caused during stretching by a heating roll in successive (i.e. two stage) biaxial stretching, so that cold stretching is necessitated in practice, and under such conditions, voids are produced during stretching and therefore preparation of transparent film is impossible. To overcome such drawbacks, there has been adopted a method in which a base film is stretched in a machine direction by a heating roll, the low melting point polymer is laminated on one surface or both surfaces of the base film and then the laminated film is stretched by a tenter without contacting the surface being susceptible to melt-adhesion. By this method, however, the low melting point polymer layer is melted by heating at stretching, and the gloss and the transparency are reduced. Further, a film incorporated having with a low molecular weight thermoplastic resin shows sufficient seal strength at low temperature, but the strength at the sealed portion is lowered when maintained at high temperature. Since the film immediately after heat sealing is at high temperature, the weakness of the seal strength at high temperature means the practical impossibility of tight sealing.

Successive biaxial stretching is the most economical method for preparation of packaging material, because it can efficiently reproducibly provide films of precise thickness.

As the result of extensive study of these circumstances, the present inventors have succeeded in obtaining packaging materials with high transparency and gloss having excellent antistatic properties and heat sealability.

According to the present invention, there is provided a packaging material having excellent heat seal packaging properties, which comprises (A) a base layer consisting of a stretched film made of a polymer composition comprising (a-1) a propylene polymer and (B) a surface layer consisting of a stretched film made of a polymeric mixture comprising a polymer blend provided on at least one surface of said base layer, said polymer blend comprising (b-1) a copolymer of ethylene and propylene and (b-2) a copolymer of butene and any other polymerizable monomer having an ethylenic unsaturation in a weight proportion of 5:95 to 95:5.

The packaging material of the invention specifically includes (I) a packaging material having excellent heat seal packaging properties, which comprises (A) a base layer consisting of a stretched film made of a polymer composition comprising (a-1) a propylene polymer and (B) a surface layer consisting of a stretched film made of a polymeric mixture comprising a polymer blend provided on at least one surface of said base layer, said polymer blend comprising (b-1) a copolymer of ethylene and propylene and (b-2) a copolymer of butene and any other polymerizable monomer having an ethylenic unsaturation in a weight proportion of 82:18 to 95:5, and (II) a packaging material having excellent heat seal packaging properties, which comprises (A) a base layer consisting of a stretched film made of a polymer composition comprising (a-1) a propylene polymer and (B) a surface layer consisting of a stretched film made of a polymeric mixture comprising a polymer blend and a low molecular weight thermoplastic resin in a weight proportion of 75:25 to 97:3 provided on at least one surface of said base layer, said polymer blend comprising (b-1) a copolymer of ethylene and propylene and (b-2) a copolymer of butene and any other polymerizable monomer having an ethylenic unsaturation in a weight proportion of 5:95 to 95:5.

The propylene polymer (a-1) for the base layer (A) is a polymer mainly comprising propylene and having a melting point of 140° C. or higher, preferably 150° C. or higher. Specific examples thereof are isotactic polypropylene having an isotactic index of 85% by weight or higher, a copolymer of ethylene and propylene having an ethylene content of 7% by weight or lower, a copolymer of propylene and an α-olefin having 4 to 6 carbon atoms having a propylene content of 90% by weight or higher, etc. The propylene polymer (a-1) is desired to have an intrinsic viscosity of 1.6 to 3.0 dl/g (tetraline solution at 135° C.), particularly 1.8 to 2.5 dl/g. With an intrinsic viscosity smaller than 1.6 dl/g, preparation of a transparent packing material is difficult. With an intrinsic viscosity higher than 3.0 dl/g, the extrudability is lowered, and the resultant material is inferior in appearance and, when used for external package, can only afford a package with insufficient gloss, thereby decreasing the commercial value of the packaged product.

The lower molecular weight thermoplastic resin which may be incorporated into the polymer composition for the base layer (A) in order to improve the characteristic properties is usually employed in an amount of 3 to 25% by weight based on the combined amount of the propylene polymer (a-1) and the low molecular weight thermoplastic resin. The low molecular weight thermoplastic resin may be a resin which is compatible with the propylene polymer (a-1), has a softening point (determined according to ASTM D-36-26) of 70° to 150° C., shows a thermal stability at a temperature of 150° C. or higher and preferably possesses a melting viscosity of about 20,000 cp or lower at 200° C. The term "miscibility" herein used is intended to mean that, when polypropylene is admixed with the low molecular weight thermoplastic resin, separation of layers (incompatibility of the two materials) does not occur. The term "thermal stability" is intended to mean that permanent change is not caused in the properties of the resin even after heating at a designed temperature for 1 hour in the presence of the air. The melt viscosity is determined according to the test method of ASTM D-1824-66 by the aid of Brookfield viscometer with heating to a designed high temperature.

As the low molecular weight thermoplastic resin, there may be used hydrocarbon resins, rosins, dammars, phenolic resins, chlorinated aliphatic hydrocarbon waxes, chlorinated polynuclear aromatic hydrocarbons, etc.

The hydrocarbon resins are hydrocarbon polymers derived from coke oven gas, coal tar distillates, decomposed or deep-decomposed petroleum materials, substantially pure hydrocarbon materials and turpentine oil. Examples of typical hydrocarbon resins are cumarone-indene resins, petroleum resins, styrene resins, cyclopentadiene resins, terpene resins, etc. These resins are described in Kirk-Othmer's "Encyclopedia of Chemical Technology", Second edition, Vol. 11, 242-255 (1966).

The cumarone-indene resins are hydrocarbon resins recovered from coke oven gas or obtained by polymerization of resin-forming substances present in coal tar distillates, phenol-modified cumarone-indene resins and their derivatives. These resins are described in the above mentioned literature (Second edition, Vol. 11, 243-247).

The petroleum resins are hydrocarbon resins obtained by polymerization of deep-decomposed petroleum materials in the presence of a catalyst. These petroleum materials contain usually a mixture of resin-forming substances such as styrene, methylstyrene, vinyltoluene, indene, methylindene, butadiene, isoprene, piperylene and pentylene. These resins are described in the above mentioned literature (Second edition, Vol. 11, 248-250).

The styrene polymers are low molecular weight homopolymers of styrene and copolymers of styrene with other monomers such as α-methylstyrene, vinyltoluene and butadiene.

The cyclopentadiene resins are cyclopentadiene homopolymers and copolymers derived from coal tar distillates and separated petroleum gas. These resins are prepared by keeping cyclopentadiene-containing materials at high temperature for a considerably long time. Depending on the reaction temperature, dimers, trimers or higher polymers may be obtained. These resins are described in the above literature (Second edition, Vol. 11, 250-251).

The terpene resins are polymers of terpenes (=hydrocarbons of the formula: $C_{10}H_{16}$ present in almost all of essential oils and oil-containing resins of plants) and phenol-modified terpene resins. Specific examples of terpenes are α-pinene, β-pinene, dipentene, limonene, myrcene, bornylene, camphene and similar terpenes. These resins are described in the said literature (Second edition, Vol. 11, 252-254).

The rosins are natural resinous substances present in oil-containing resins of pine trees, rosin esters, modified rosins (e.g. fractionated rosins, hydrogenated rosins, dehydrogenated rosins) and other similar substances. These substances are described in the said literature (Second edition, Vol. 17, 475-505).

The dammars are colorless or yellow substances present in plants such as kanari and other similar substances. These substances are described in "Encyclopedia Chimica" (Kyoritsu Shuppan), Vol. 5, 776 (1961).

The phenol resins are reaction products obtained from phenols and aldehydes. Examples of phenols are phenol, cresol, xylenol, p-tert-butylphenol, p-phenylphenol and other similar substances. Examples of aldehydes are formaldehyde, acetaldehyde and furfuralaldehyde. These resins are described in the above mentioned Encyclopedia (Second edition, Vol. 15, 176-207).

The chlorinated aliphatic hydrocarbon waxes are chlorinated paraffin waxes (usually called "chlorinated waxes"). Typical ones contain about 30 to 70% by weight of chlorine.

The chlorinated polynuclear aromatic hydrocarbons are chlorinated hydrocarbons containing at least two aromatic rings such as chlorinated biphenyl, terphenyl and their mixtures. Typical ones contain about 30 to 70% by weight of chlorine.

The base layer (A) of the invention may contain other polymers in such amounts as not deteriorating its quality. It may also contain an antistatic agent, a lubricant, an anti-blocking agent and the like.

When an antistatic agent is to be used, it may be incorporated into the polymer composition for the base layer (A) in an amount of 0.1 to 3 parts by weight to 100 parts by weight of the propylene polymer (a-1). When a lubricant and/or an anti-blocking agent are to be employed, they may be incorporated into the polymer composition for the base layer (A) in an amount of 0.1 to 3 parts by weight to 100 parts by weight of the propylene polymer (a-1). Examples of the lubricant are higher fatty acid amides, higher fatty acid esters, waxes, metal soaps, etc. Examples of the anti-blocking agent are inorganic additives such as silica, calcium carbonate, magnesium silicate and calcium phosphate, non-ionic surfactants, anionic surfactants, insoluble (i.e. incompatible) organic polymers (e.g. polyamides, polyesters, polycarbonates), etc. As the antistatic agent, there may be used any commercially available one which is blendable, and its typical examples include the following compounds:

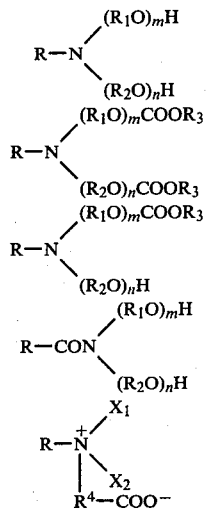

wherein R and $R_3$ are each a monovalent aliphatic group having 12 to 22 carbon atoms, $R_1$ and $R_2$ are each a divalent hydrocarbon group having 2 to 4 carbon atoms, $R_4$ is a divalent hydrocarbon group having 1 to 3 carbon atoms, $X_1$ and $X_2$ are each a saturated or unsaturated hydrocarbon group having not more than 22 carbon atoms and optionally bearing hydroxyl or alkoxy or a group of the formula: $-(R_5-O)_pH$ (in which $R_5$ is a divalent hydrocarbon group having 1 to 4 carbon atoms and p is an integer of not more than 20), or they may be taken together to make a ring and $m+n$ is an integer of 0 to 8. There may be also used monoglycerides of fatty acid esters, polyoxyethylene alkyl phenyl ether, etc.

To obtain a sealed package, it is disadvantageous that supply of the packaging material to the product to be packed is not effected constantly and straightly because of troubles in the packaging material-supplying portion of an automatic packaging machine such as adsorption of the film due to static electricity, winding of the film round the edge of the cutter and pulling of the film toward the guide plate by static gravitation. In this respect, it has been found that static electricity in the automatic packaging machine can be prevented to a great extent by incorporation of an antistatic agent into the base layer of the film. Particularly by addition of a low molecular weight thermoplastic resin, the prevention of the undesirable phenomenon is promoted or the occurrence of the phenomenon is delayed, whereby a much more remarkable effect is exhibited to facilitate the supply of the film. The use of the antistatic agent in an excessive amount is, however, not favorable since it causes lowering of the heat sealability, whitening at the surface, stick blocking, etc.

To prevent the occurrence of static electricity during the automatic packaging, at least one surface of the composite film may be subjected to electro-discharge treatment such as corona discharge treatment or glow discharge treatment so that the improvement of the antistatic property and the slidability will be attained by the use of a small amount of the antistatic agent. When, however, the said electro-discharge treatment is applied, the heat sealability of the film particularly at low temperature is deteriorated, and the increase of the intensity will result in loss of the heat sealability even at high temperature. In order to improve the antistatic property and the slidability without the depression of the heat sealability, the use of a polymeric mixture comprising a low molecular weight thermoplastic resin for the surface layer (B) and the application of electro-discharge treatment thereto are recommended. Examples of the low molecular weight resin are rosins, dammars, phenolic resins, hydrocarbon resins, etc. The antistatic property may be represented, for instance, by an surface resistivity, and it is usually $10^{12-13}$ $\Omega$.cm or less. When the thickness is smaller, a lower surface resistivity is required. If it is from $10^8$ to $10^{10}$ $\Omega$.cm, it will be applicable to almost all kinds of automatic packaging machines.

When the wetting tension of the composite film of the invention at the heat seal surface is brought to 30.5 to 36 dyne/cm as the result of the application of electro-discharge treatment, the antistatic property and the slidability are quite good without lowering of the heat sealability. When the wetting tension is higher than 36 dyne/cm, particularly less than 55 dyne/cm (favorably less than 46 dyne/cm), the said effect is enhanced and the heat sealability at low temperature is increased.

To prepare the packaging material, the surface layer (B) is provided on at least one surface of the base layber (A). In other words, the surface layer (B) may be provided on only one surface of the base layer (A) to make a composite film composed of the surface layer (B)/the base layer (A), or on both surfaces of the base layer (A) to make a composite film of the surface layer (B)/the base layer (A)/the surface layer (B).

The surface layer (B) consists of a uniaxially or biaxially stretched film and adheres firmly on the surface of the base layer (A). The copolymer of ethylene and propylene (b-1) for the surface layer (B) has an ethylene content of 0.5 to 10.5% by weight, a propylene content of 99.5 to 90% by weight, and a melt index of 0.5 to 10 g/10 min. Particularly preferred is a random copolymer having an ethylene content of 2.5 to 6% by weight and a melt index of 1.0 to 60 g/10 min. With an ethylene content of 0.5% by weight or less, the resultant film is inferior in heat sealability at low temperature, and the transparency and the gloss are decreased. With an ethylene content of 10% by weight or higher, the lubricity at heated state is reduced and wrinkles and scratches are formed in the obtained package, preparation of sealed package being impossible. For retaining a sufficient heat sealability at low temperature even after electro-discharge treatment, the ethylene content in the copolymer (b-1) is preferred to be 3.6 to 10% by weight.

The copolymer of butene and the other polymerizable monomer (b-2) for the surface layer (B) is a copolymer which contains 70 to 99% by weight of butene. The other polymerizable monomer may have not more than 10 carbon atoms. When the butene content in the copolymer (b-2) is smaller than 70% by weight, the heat seal property at low temperature is lacking and the friction coefficient at high temperature exceeds 1.4, so that the lubricity of the film or sheet is insufficient and scratches and wrinkles are formed thereon at heat sealing, preparation of sealed package by the aid of the automatic packaging machine being impossible. Further, in the above mentioned successive biaxial stretching, clinging or melt-adhesion to the heat-stretching roll is readily caused to make it impossible to obtain a smooth packaging material in film or sheet form having an excellent appearance without flaws. When the butene content is larger than 99% by weight, the film is insufficient in transparency and becomes translucent, so that a transparent package whose contents are clearly visible can not be obtained. The incorporation of the low molecular weight thermoplastic resin in an amount within the said range of the invention into the surface layer (B) improves remarkably the transparency and the gloss. In addition, it produces a high antistatic property while retaining a good heat sealability when electro-discharge treatment is applied. However, it may be noted that when the surface layer (B) is composed of a film made of a polymeric mixture comprising a polymer blend of the copolymer (b-1) and the copolymer (b-2) in a weight proportion of 82:18 to 95:5, the resulting composite film shows sufficient transparency and gloss without incorporation of any low molecular weight thermoplastic resin therein. In case of the copolymer (b-1) in the polymer blend being less than 82% by weight, the use of the low molecular weight thermoplastic resin in an amount of less than 3% by weight produces only insufficient transparency and gloss. When the amount of the low molecular weight thermoplastic resin is larger than 25% by weight, the transparency and the gloss are deteriorated and tucking power at high temperature is lowered to decrease seal-packing ability.

The mixing proportion of the copolymer (b-1) and the copolymer (b-2) is from 5:95 to 95:5 by weight. It is preferable to add a silicone oil in an amount of 0.01 to 0.15 parts by weight to 100 parts by weight of the combined amount of the copolymer (b-1) and the copolymer (b-2).

Examples of the said silicone oil are polydimethylsiloxane, polymethylphenylsiloxane, olefin-modified silicone, polyether (e.g polyethylene glycol, polypropylene glycol)-modified silicone, olefin/polyether-modified silicone, epoxy-modified silicone, amino-modified silicone, alcohol-modified silicone and other silicone oils containing modified siloxane bond. Among them, olefin-modified silicone, polyether-modified silicone and olefin/polyether-modified silicone are particularly preferable. The silicone oil improves the friction coefficient of the film at heated state, reduces the slide resistance caused during hot plate seal by an automatic packaging machine and thus prevents generation of wrinkes, which makes it possible to obtain a film having a beautiful appearance, a high sealing ability and excellent close-fitting to a product to be packaged. Further, decrease of the gloss due to sliding can be prevented to obtain a sealed portion with beautiful appearance. By the use of the silicone oil, the friction coefficient a high temperature in heat sealing under sliding can be decreased to 1.4 or smaller. For obtaining sufficient effect, the silicone oil is desired to possess a viscosity of 50 to 10,000 cs, preferably 50 to 300 cs. The effect of the silicone oil can be further increased by combined use of ethylene oxide-addition product of castor oil having a softening point of 70° to 140° C., oxidized synthetic wax, higher fatty acid alkyl ester, polyalcohol alkylate-ethylene oxide addition product, fatty acid amide, etc. These compounds are preferably used in an amount of 1 to 300 parts, preferably 50 to 300 parts, to 100 parts of the silicone oil. The combined use of these compounds together with the silicone oil prevents stick slip at a temperature of room temperature to 100° C. which is apt to occur by the sole use of the silicone oil and improves the lubricity between the film and various metal guide plates of the automatic packaging machine to prevent bad package. Further, the lubricity at high temperature under elevated pressure can be improved, the friction coefficient at high temperature being decreased to 1.4 or smaller, preferably 1.0 or smaller, which is extremely important for obtaining an excellent sealed package according to the invention. Although the silicone oil and the said additives can give these advantageous effects, they are apt to decrease the heat sealing property of the film or sheet and the transparency, and because of such tendency of decrease of heat sealing property at low temperature, in case of their amounts being larger, it is required in practice to effect heat-sealing at relatively high temperature.

Incorporation of a lubricant or an anti-blocking agent into the surface layer (B) in an amount of 0.1 to 3 parts by weight to 100 parts by weight of the combined amount of the copolymer (b-1) and the copolymer (b-2) is effective in improvement of the lubricity and the anti-blocking property of the composite film of the invention. Specific examples of the lubricant and the anti-blocking agent may be the same as hereinbefore mentioned in connection with their use for the base layer (A).

The thickness of the packaging material of the invention may be decided depending on the use of the sealed package. In usual, a thickness of 5 to 150 microns, particularly 15 to 60 microns, is adopted. The total thickness of the surface layers (B) is 0.2 to 50% to the whole thickness of the packaging material. In case of preparing a sealed package by the aid of an automatic packaging machine, the absolute value of the surface layer (B) becomes important, in addition to the said thickness ratio. The desirable thickness for each surface layer is 0.2 to 10 microns, particularly 0.2 to 3 microns. As the mechanism of operation of the automatic packaging machine, the following two processes are adopted: the process of thermal adhesion with sliding under heating and elevated pressure and the process of thermal adhesion with pushing under heating. In case of the process of thermal adhesion with sliding under heating, the thickness of each surface layer is desired to be 0.2 to 3 microns. In case of the process of thermal adhesion with pushing under heating, the thickness of each surface layer is preferred to be 0.7 to 10 microns.

The packaging material of the invention is the one stretched into at least one direction. Preferably, the film for the base layer (A) is the one as biaxially stretched and the film for the surface layer (B) is the one as uniaxially or biaxially stretched.

For preparation of the packaging material of the invention, there are available at least two processes, of which one comprises stretching an unstretched composite film into a machine direction and stretching further the stretched film into a direction substantially perpendicular to said machine direction, said unstretched composite film comprising (A) a base layer made of a polymer composition comprising (a-1) a propylene polymer and (B) a surface layer made of a polymeric mixture comprising a polymer blend provided on at least one surface of said base layer, said polymer blend comprising (b-1) a copolymer of ethylene and propylene and (b-2) a copolymer of butene and any other polymerizable monomer having an ethylenic unsaturation in a weight proportion of 5:95 to 95:5, and the other one stretching a composite film comprising (A) a base layer consisting of an uniaxially stretched film made of a polymer composition comprising (a-1) a propylene polymer and (B) a surface layer consisting of an unstretched film made of a polymeric mixture comprising a polymer blend provided on at least one surface of said base layer into a direction substantially perpendicular to the direction into which the uniaxially stretched film has been stretched, said polymer blend comprising (b-1) a copolymer of ethylene and propylene and (b-2) a copolymer of butene and any other polymerizable monomer having an ethylenic unsaturation in a weight proportion of 5:95 to 95:5.

For instance, the composite film obtained by either one of the following methods may be stretched in one direction or in two directions to give the packaging material of the invention: the co-extrusion method in which the base layer (A) and the surface layer (B) are extruded from separate extruding machines to form a compound stream in a melted state which is then subjected to extrusion shaping; the laminating method in which the layers are extruded separately in a melted state and the extruded products are laminated before solidification by cooling; the adhesion method in which one of the layers is shaped in film or sheet form under solidification by cooling and the other layer is piled thereon in a melt-extruded state. Further, for instance, a film(s) for the surface layer (B) may be piled or melt-extruded onto at least one surface of a uniaxially stretched film for the base layer (A), followed by stretching into a direction perpendicular to the direction into which the uniaxially stretched film has been stretched.

The packaging material of the invention may be in the form of flat film of tubular film. It is the one stretched at least uniaxially, preferably biaxially.

A characteristic feature of the packaging material of the invention is present in that it can be prepared by the successive biaxial stretching method in which heating roll is used in the longitudinal stretching, though the preparation can be effected more easily by the simultaneous biaxial stretching method. In case of the successive biaxial stretching, a strong binding power is obtained between the layers to afford a packaging material with excellent heat seal strength. In addition, the preparation of the composite form can be effected economically.

The preferable conditions for obtaining the packaging material of the invention as a stretched film are explained in the following description. In case of uniaxial stretching, the material is stretched 3.5 to 10 folds in the machine direction or the transverse direction. The stretching temperature is usually 100° to 160° C. in roll stretching or 140° to 165° C. in tenter stretching. In case of biaxial stretching, simultaneous stretching may be effected by stretching 3.5 to 7 fold, preferably 4 to 6 folds, respectively in the machine and transverse directions, and successive stretching may be effected by stretching by 3.5 to 10 fold, preferably 3.8 to 7.5 fold, in the machine direction and 4 to 12 fold, preferably 6 to 9 fold, in the transverse direction. In case of simultaneous biaxial stretching, the temperature is 140° to 165° C. In the successive biaxial stretching process, the temperature at the first step is 100° to 160° C., preferably 110° to 145° C., and the temperature at the second step is 140° to 165° C., preferably 145° to 160° C. The thermal setting is effected after the uniaxial stretching or after the biaxial stretching at a temperature higher than the said stretching temperature, usually at 140° to 167° C., for 1 second to 1 minute. The resultant composite films are usually subjected to heat induced melt adhesion, the surface layers (B) being opposite to each other. Where necessary, heat induced melt adhesion between the base layer (A) and the surface layer (B) may be effected.

The packaging material of the present invention may be used for packaging various articles by conventional procedures adopting heat sealing. An automatic packaging machine as commonly used has a packaging speed of 30 to 500 packages/min. The packaging speed of the most popular one is from 50 to 300 packages/min. In those conventional machines, the heat seal temperature employed when using the packaging material of the invention may be usually from 120° to 190° C., preferably from 130° to 180° C., although it depends on the packaging speed, the film thickness, etc. The heating time is usually from 0.05 to 2.0 seconds, particularly from 0.2 to 1.0 seconds, though it is greatly varied with repetition of heating.

When heat sealing is effected at a high temperature and at a high speed by the use of an automatic packaging machine, packaging materials are apt to be damaged. In addition, a flat seal surface is hardly obtainable due to the production of thermal shrinkage. Different from films made of polyvinyl chloride, the biaxially stretched films made of polypropylene can not attain even shrinkage because of its high crystallinity and melting point. In case of biaxially stretched films made of polypropylene, the part contacted with a hot plate is readily shrinked so that the sealed surface is uneven.

The packaging material of the invention has excellent antistatic properties and heat sealability at low temperature and can be used in conventional automatic packaging machines with ease. When the sealed product is kept at 100° C., the retention of the seal strength is more than 60%, frequently more than 80%. The coefficient of friction at 120° C. is less than 1.4. Due to these characteristics, packaging can be accomplished without production of wrinkles and scratches.

The packaging material of the invention may be adhered not only on each other but also on any other heat sealable surface such as a polypropylene laminated film, a polyethylene laminated film or a polybutene laminated plate. Further, it may be utilized for use of surface covering such as adhesive tape, sheet and protective film.

Practical and presently preferred embodiments of the invention are illustratively shown in the following Examples wherein part(s) and % are by weight unless otherwise indicated. In these Examples, the physical properties are determined as follows:

(1) Coefficient of friction:
 (A) Coefficient of friction at room temperature
 Determination is effected at 20° C. under a relative humidity of 65% according to ASTM D-1894.
 (B) Coefficient of friction at high temperature
 On the surface of a hot plate heated at 120° C., an adhesive tape made of polyvinylidene fluoride is sticked, and a test film or sheet is contacted therewith. Under a vertical load of 4.5 g/cm$^2$, sliding is effected with a speed of 2 m/sec, and the coefficient of friction is recorded.

(2) Heat seal strength:

Heat sealing is effected by the aid of a thermal inclination heat sealer (manufactured by Toyo Seiki K.K.) under a pressure of 1 -kg/cm² for 0.5 seconds, and the peeling-off strength is measured under a speed of 200 mm/min.

(3) Seal Packaging Degree:

By the aid of an automatic machine, 100 sealings per minute are effected at 160° C., and the air-tightness of the sealed portion is judged from the amount of leaking water. Into an externally packed product in a box form, water containing 0.2% of a surface active agent (50 ml) is poured, and the amount of water leaking in 1 minute is measured. Evaluation is effected according to the following criteria:

| Class | Amount of leaking water (ml/min) |
|-------|----------------------------------|
| A     | 0-10                             |
| B     | 11-20                            |
| C     | 21-30                            |
| D     | 31-50                            |
| E     | larger than 50                   |

(4) Transparency and haze:

Determination is made by the aid of a haze tester (manufactured by Toyo Seiki K.K.) according to JIS-Z6714.

(5) Gloss:

Determination is made according to JIS-Z8714.

(6) Folds:

As to the folds observed at the heat sealed part, classification is made on the following criteria:

| Class | Folds          |
|-------|----------------|
| A     | None           |
| B     | Little         |
| C     | Moderate       |
| D     | Much           |
| E     | Over the whole |

(7) Surface resistivity:

A test film is subjected to seasoning at 23° C. in a relative humidity of 65%, and then its surface resistivity is measured by the use of an ultra-insulation meter (manufactured by Kawaguchi Denkisha K.K.).

(8) Automatic supply:

By the use of an automatic packaging machine W-37 (manufactured by Tokyo Automatic Machinery Co., Ltd.), packaging is effected at a rate of 100 packages/minute. The state of the continuous automatic supply of a film is observed for 1 minute, and evaluation is made on the following criteria:

o: No material problem; smooth supply.

Δ: Occasional problems occur.

x: Automatic supply is impossible due to winding-up of the film around the cutter and electrostatic adhesion of the film onto the guide surface.

(9) Surface wetting tension:

A test liquid consisting of dimethylformamide and ethyleneglycol monoethylether (manufactured by Wako Pure Chemicals Co., Ltd.) is applied onto the surface of a film. When the cohesion of the test liquid is going to start 2 seconds after the application, the wetting tension is measured and taken as the surface tension of the film.

EXAMPLE 1

To 100 parts of a mixture of isotactic polypropylene (intrinsic viscosity, 1.8 dl/g at 135° C. on tetraline solution) and petroleum resin ("Arcon P-115" manufactured by Arakawa Rinsan K.K.) in a weight ratio of 90:10, 0.5 parts of glycerol stearate and 0.8 part of an alkylamine type antistatic agent are added to obtain a composition for the layer (A).

Separately, 90 parts of a polymeric mixture comprising ethylene-propylene copolymer (ethylene content, 4.5%; melt index, 2.0 g/10 min) and butene-1-ethylene copolymer (butene content, 97%) in a weight ratio of 40:60 are blended with 10 parts of low molecular weight polypropylene (molecular weight, 2000). To 100 parts of the blended mixture, 0.04 part of polypropylene glycol-modified silicone (viscosity at 20° C., 100 cs), 0.02 part of castor oil-ethylene oxide adduct, 0.3 part of glycerol fatty acid ester and 0.8 part of hydroxystearoamide ("Diamide KH" manufactured by Nihon Kasei K.K.) are added to obtain a composition for the layer (B).

The compositions as prepared above are melt extruded to obtain an unstretched film composed of the three layers (B)/(A)/(B) and having a thickness of 1300 microns. The film is stretched at 130° C. 4.0 fold in the machine direction and 8.0 fold in the transverse direction, subjected to thermal setting at 155° C. with a relaxation of 5% and then cooled to obtain a biaxially stretched composite film having a thickness of 35 microns. The properties of this film are shown in Table 1.

EXAMPLE 2

To 100 parts of a mixture of isotactic polypropylene (intrinsic viscosity, 2.8 dl/g at 135° C. on tetraline solution) and petroleum resin ("Arcon P-115" manufactured by Arakawa Rinsan K.K.) in a weight ratio of 95:5, 0.5 part of glycerol stearate 0.1 part of polyhydroxyethylene stearylamine and 0.5 part of stearic acid diethanolamide are added to obtain a composition for the layer (A).

Separately, 90 parts of a polymeric mixture comprising ethylene-propylene copolymer (ethylene content, 4.5%, melt index, 3.0 g/10 min) and butene-1-ethylene copolymer (butene content, 97%) in a weight ratio of 60:40 are blended with 10 parts of a rosin ester ("Pencel A" manufactured by Arakawa Rinsen K.K.). To 100 parts of the blended mixture, 0.3 part of glycerol fatty acid ester, 0.2 part of oleyl acid amide and 0.3 part of calcium carbonate are added to obtain a composition for the layer (B).

The compositions as prepared above are melt extruded to obtain an unstretched film composed of the three layers (B)/(A)/(B) and having a thickness of 1300 microns. The film is stretched at 130° C. 4.5 fold in the machine direction and 8.0 fold in the transverse direction, subjected to thermal setting at 160° C. with a relaxation of 8% and then cooled to obtain a biaxially composite film having a thickness of 35 microns. This film is subjected to seasoning at 40° C. for 2 hours.

The film obtained in Example 1 or 2 is cut to make an narrow breadth, and external package of square boxes being 70 mm in height, 55 mm in width and 20 mm in thickness is effected by the aid of an automatic packaging machine of sliding type at a temperature as shown in Table 1 under a speed of 100 boxes/min.

COMPARATIVE EXAMPLE 1

The preparation of a composite film is effected in the same manner as in Example 1 except that the low molecular weight polypropylene is not used in the composition for the layer (B). Using the resultant film, the packaging test is carried out as in Example 1.

COMPARATIVE EXAMPLE 2

On each surface of a biaxially stretched polypropylene film comprising solely the polymer composition of the base layer in Example 1, a mixture comprising polyvinylidene chloride as the main component and a lubricating agent and an antistatic agent as the additives is applied to form a coating layer of 1.5 g/m$^2$ so as to obtain a both surface-heat-sealable packaging material. Using the thus obtained packaging material, package of square boxes is effected as in Example 1 by the aid of an automatic packaging machine.

COMPARATIVE EXAMPLE 3

A mixture of isotactic polypropylene (intrinsic viscosity, 2.0 dl/g) (90%) and rosin (10%) is melt extruded to obtain an unstretched film having a thickness of 1400 microns. This film is stretched 5.0 fold in the machine direction at 140° C. and then 8 fold in the transverse direction at 150° C. to obtain a biaxially stretched film having a thickness of 35 microns, which is subjected to thermal setting at 160° C. for 10 seconds and then to corona discharge treatment to make a wetting tension of 40 dyne/cm. Using the thus treated film, package of square boxes is effected as in Example 1 by the aid of an automatic packaging machine.

COMPARATIVE EXAMPLE 4

Using a multi-layer dies having three manifolds, an unstretched film composed of three layers is prepared by melt-extruding isotactic polypropylene (intrinsic viscosity, 2.1 dl/g) as the base layer and applying on both surfaces of the base layer propylene-butene-1 copolymer (butene-1 content, 10%) in a melt-extruded form as the surface layer. The resultant film having a thickness of 1110 microns is stretched 4 fold in the machine direction at 120° C. and 8 fold in the transverse direction at 150° C. and then subjected to heat treatment to obtain a biaxially stretched film having a thickness of about 35 microns.

The thickness of the surface layer is about 0.8 micron on one surface. Using the thus treated film, package of square boxes is effected as in Example 1 by the aid of an automatic packaging machine.

COMPARATIVE EXAMPLE 5

The preparation of a biaxially stretched composite film is effected in the same manner as in Comparative Example 4 except that ethylene-propylene copolymer (ethylene content, 4.5%; melt index, 2 g/10 min) is employed as the surface layer. Using the resultant film, package of square boxes is effected as in Example 1 by the air of an automatic packaging machine.

COMPARATIVE EXAMPLE 6

The preparation of a biaxially stretched film is effected in the same manner as in Example 1 except that a composition comprising 50% of isotactic polypropylene (intrinsic viscosity, 2.0 dl/g) and 50% of polybutene-1 is applied as the surface layer on both surfaces of the base layer. Using the resultant film, package of square boxes is effected as in Example 1 by the aid of an automatic packaging machine.

TABLE 1

| Properties | | Film Ex. 1 | Ex. 2 | Comparative Example 1 | Comparative Example 2 | Comparative Example 3 | Comparative Example 4 | Comparative Example 5 | Comparative Example 6 |
| --- | --- | --- | --- | --- | --- | --- | --- | --- | --- |
| Transparency (%) | | 94 | 95 | 90 | 93 | 95 | 91 | 94 | 87 |
| Gloss (%) | | 98 | 103 | 85 | 108 | 112 | 83 | 92 | 75 |
| Haze value (%) | | 4.9 | 3.8 | 6.0 | 4.7 | 1.8 | 8.5 | 2.8 | 12.0 |
| Friction coefficient | Between films | 0.50 | 0.47 | 0.40 | 0.38 | 0.45 | 0.78 | 0.68 | 0.62 |
| | Between film and metal | 0.20 | 0.18 | 0.16 | 0.15 | 0.22 | 0.27 | 0.25 | 0.21 |
| coefficient of friction at high temperature | | 0.85 | 1.0 | 0.89 | 0.80 | 0.75 | 1.6 | 1.2 | 1.3 |
| Seal-packaging degree | | | | | | | | | |
| 120° C. | | C | C | C | E | E | D | E | C |
| 135° C. | | A | A | A | D | E | C | E | B |
| 150° C. | | A | A | A | C | E | B | D | A |
| 165° C. | | A | A | A | C | E | C | C | C |
| Heat-seal strength (g/cm) | | | | | | | | | |
| 120° C. | | 45 | 65 | 50 | 30 | 40 | 60 | 0 | 20 |
| 135° C. | | 135 | 185 | 130 | 40 | 60 | 190 | 15 | 30 |
| 150° C. | | 140 | 230 | 150 | 65 | 70 | 210 | 160 | 60 |
| 165° C. | | 170 | 280 | 180 | 80 | 70 | 250 | 280 | 75 |
| Surface resistivity (ω.cm) | | $10^{9.7}$ | $10^{9.2}$ | $10^{10}$ | $10^9$ | more than $10^{15}$ | more than $10^{16}$ | more than $10^{16}$ | more than $10^{16}$ |
| Appearance of package | | good | good | good | good | good, but readily broken | bad, a lot of wrinkles at sealed portion, tight package being impossible | bad, a lot of wrinkles at sealed portion | insufficient in transparency, lacking in commercial value |

As can be seen from the results, the film of the invention has excellent transparency, gloss and sealability and affords a commercially valuable package with good gloss without producing wrinkles and without losing the color of the product to be packed or of the printed letters on its surface.

To attain a high sealing degree, a large heat-seal strength is desirable, but more important are to satisfy the following conditions: absence of wrinkles at the sealed portion; absence of the state of bad tucking; that the surface softened by the plate melt-adheres in a flat state and slides under adhesion without peeling-off of the sealed portion; that a high lubricity is shown at heating without producing wrinkles and the state of bad tucking; the adhesion of the sealed portion.

The film obtained in Comparative Example 1 also shows an excellent packaging ability but is inferior to the film of the invention in transparency and gloss.

The film obtained in Comparative Example 2 is excellent in workability at package and in appearance, but the seal-packing ability is extremely low. The use of this film is therefore limited to package of products having a light weight and not requiring low moisture-permeability and insect-proof properties.

The film obtained in Comparative Example 3 is insufficient in automatic suppliability and can not be used in a packaging machine. By packaging using manual supply of this film, the sealed portion is excellent in gloss and appearance, wrinkles being hardly produced. But, the heat-seal strength in small and the seal-packaging degree is extremely low, so that kinds of products to be packed are limited to a narrow range.

heat-sealing ability at low temperature is insufficient. At low temperature at which wrinkles are hardly produced, the seal strength is small, and a sealed package is not obtained. At the heat-seal temperature higher than 150° C. at which the seal strength is improved, a lot of wrinkles are produced and the appearance is inferior, so that a sealed package can not be obtained. Thus, the degree of bad package is extremely large as in Comparative Examples 3 and 4.

In the film obtained in Comparative Example 6, the miscibility of polypropylene with polybutene-1 is small, and the transparency and the heat-seal strength are deteriorated. The lubricity at high temperature is also insufficient, so that a sealed package can not be obtained, and the degree of bad packages is large. Thus, the film can not be employed in practical use.

For the purpose of giving an automatical suppliability to the films of Comparative Examples 3 to 6, an alkylamine-ethylene oxide addition product ("denone 331" manufactured by Marubishi Yuka K.K.) is incorporated into the composition of the surface layer in an amount of 0.8% to the total weight of the composition in the preparation of each film, and the properties of the resultant films are determined. The results (only those in which notable changes are observed in comparison with the results of Table 1) are shown in Table 2.

TABLE 2

| Properties Film | | Comparative Example 3 | Comparative Example 4 | Comparative Example 5 | Comparative Example 6 |
|---|---|---|---|---|---|
| coefficient of friction | Between films | 0.35 | 0.57 | 0.48 | 0.43 |
| | Between film and metal | 0.18 | 0.22 | 0.19 | 0.17 |
| coefficient of friction at high temperature | | 0.72 | 1.4 | 1.10 | 1.22 |
| Automatic suppliability | | Δ-x | Δ | Δ | Δ |
| Wrinkles at heat-sealed portion (150° C.) | | A | B-C | B | B |
| Degree of seal-packaging (150° C.) | | E | C | E | C |
| Heat-seal strength (150° C.) | | 5 | 40 | 15 | 23 |
| Degree of close-fitting packaging (150° C.) | | D | C | A | A |
| Degree of bad package (150° C.) | | 100 | 65 | 100 | 50 |
| Surface resistivity | | $10^{14}$ | $10^{13.1}$ | $10^{13}$ | $10^{13.5}$ |
| Appearance of package | | unknown because of incomplete package | wrinkles remaining and sealing degree being low | appearance being improved to some extent but sealed portion being uneven (bad sealing) | a lot of flaws being present at sealed portion and transparency being lacking, inutile for practical use |

The film obtained in Comparative Example 4 has a high heat-seal strength, but the lubricity at high temperature is extremely low which produces a lot of wrinkles. In addition, the adhesion to the product to be packaged is insufficient, resulting in a loosely packed state. The seal-packaging degree is also small because of wrinkles and peeling-off of the sealed portion due to adhesion. Thus, practical use of this film is impossible.

In the film obtained in Comparative Example 5, the amount of wrinkles are somewhat decreased, but the

EXAMPLE 3

In order to improve the antistatic property, films are subjected to corona discharge treatment. Comparison is made in heat sealability and antistatic property. The films in Comparative Examples 3 and 4 are each prepared using a composition for the base layer comprising stearic acid diethanolamide in a content of 0.8%. Other films are prepared as above. The results are shown in Table 3.

TABLE 3

| Film Properties | Example 2 | | | Comparative Example 3 | | | Comparative Example 4 | | | Comparative Example 6 | | |
|---|---|---|---|---|---|---|---|---|---|---|---|---|
| Wet surface tension (dyne/cm) | 32 | 35 | 40 | 32 | 35 | 40 | 32 | 35 | 40 | 32 | 35 | 40 |
| Automatic suppliability | o | o | o | x | x | o | x-Δ | Δ | o | Δ | o | o |
| Degree of seal- | A | B | B | E | C | B | B | D | E | B | C | E |

TABLE 3-continued

| Film Properties | Example 2 | | | Comparative Example 3 | | | Comparative Example 4 | | | Comparative Example 6 | | |
| --- | --- | --- | --- | --- | --- | --- | --- | --- | --- | --- | --- | --- |
| packaging (160° C.) | | | | | | | | | | | | |
| Heat-seal strength (140° C.) (g/cm) | 198 | 124 | 182 | 30 | 45 | 88 | 70 | 40 | 20 | 55 | 45 | 25 |
| Surface resistivity (Ω . cm) | $10^{9.9}$ | $10^{9.5}$ | $10^{8.5}$ | $10^{14.6}$ | $10^{12.5}$ | $10^{9.0}$ | $10^{13.4}$ | $10^{12.5}$ | $10^{9.4}$ | $10^{11.3}$ | $10^{9.7}$ | $10^{8.8}$ |

As shown in the above table, the corona discharge treatment is effective in improvement of the antistatic property. However, the deterioration of the heat seala-bility and the lowering of the sealing degree are somewhat caused simultaneously therewith. In the film of the invention, the increase of the extent of corona discharge treatment results in lowering of the seal strength but when the extent of corona discharge treatment is raised over 34 to 36 dyne/cm, the seal strength is again elevated. Thus, the improvement of the antistatic property without deterioration of the sealability is possible.

EXAMPLE 4

As the base layer (A), the same composition as in Example 1 is employed. The composition of the surface layer (B) is prepared in the following manner. Ethylene-propylene copolymer (ethylene content, 4.0%; melt index, 2.5 g/10 min) (EPC) and ethylene-butene-1 copolymer (ethylene content, 5%; melt index, 2.0 g/min) (EBC) are admixed in a varied mixing proportion to obtain a polymer mixture. The thus obtained polymer mixture (95 parts) is admixed with low molecular weight polyethylene (5 parts). To 100 parts of the resultant polymer mixture, 0.05 part of polyolefin-modified silicone, 0.5 part of stearic acid monoglyceride, 0.3 part of hydroxy-stearoamide and 0.2 part of polyethylene wax are added to obtain the composition of the layer (B). Using these composition, a composite film having a thickness of 20 microns is prepared in the same manner as in Example 1. The results are shown in Table 4.

TABLE 4

| Properties \ Mixing proportion of EPC/EBC | 100/0 | 85/15 | 50/50 | 20/80 | 0/100 |
| --- | --- | --- | --- | --- | --- |
| Transparancy (%) | 92 | 95 | 93 | 92 | 90 |
| Gloss (%) | 93 | 98 | 97 | 97 | 82 |
| Haze value (%) | 2.4 | 3.0 | 3.5 | 3.8 | 4.5 |
| coefficient of friction at high temperature | 0.88 | 0.90 | 0.93 | 0.95 | 0.91 |
| Automatic suppliability | o | o | o | o | o |
| Degree of seal-packaging (150° C.) | E | B | A | A | C |
| Heat-seal strength (110° C.) (g/cm) | 0 | 50 | 95 | 75 | 40 |
| Degree of close-fitting packaging (150° C.) | E | A | A | A | B |
| Surface resistivity (Ω.cm) | $10^{11.0}$ | $10^{10.5}$ | $10^{9.6}$ | $10^{9.6}$ | $10^{9.3}$ |
| Appearance of package | package being impossible | good | good | good | almost complete package being attained, but a lot of wrinkles being produced at sealed portion |

EXAMPLE 5

As the base layer (A), the same composition as in Example 1 is employed. The composition of the surface layer (B) is prepared in the following manner. Ethylene-propylene copolymer (ethylene content, 4.5%; melt index, 2.5 g/10 min) (EPC) and ethylene-butene-1 copolymer (ethylene content, 5%; melt index, 2.0 g/min) (EBC) are admixed in a varied mixing proportion to obtain a polymer mixture. To 100 parts of the resultant polymer mixture, 0.5 part of stearic acid monoglyceride, 0.1 part of hydroxy-stearoamide and 0.3 part of polyethylene wax are added to obtain the composition of the layer (B). Using these composition, a biaxially stretched composite film having a thickness of 22 microns is prepared in the same manner as in Example 1. The film is subjected to corona discharge treatment so as to make a wet tension of 41 dyne/cm on one surface. Then, a bag is made with the film using an automatic packaging machine of horizontal form and fill type. The bag is somewhat deteriorated in sealability but shows excellent transparency and gloss. The results are shown in Table 5.

TABLE 5

| Properties \ Mixing proportion of EPC/EBC | 100/0 | 95/5 | 86/14 | 80/20 | 50/50 |
| --- | --- | --- | --- | --- | --- |
| Haze value (%) | 1.8 | 1.8 | 1.9 | 3.1 | 3.8 |
| coefficient of friction at high temperature | 0.80 | 0.82 | 0.83 | 0.88 | 0.90 |
| Automatic suppliability | o | o | o | o | o |
| Wrinkles at heat-sealed portion | A | A | A | A | C |

TABLE 5-continued

| Properties | Mixing proportion of EPC/EBC 100/0 | 95/5 | 86/14 | 80/20 | 50/50 |
|---|---|---|---|---|---|
| (150° C.) | | | | | |
| Degree of seal-packaging (150° C.) | E | B | B | A | A |
| Heat-seal strength (130° C.) (g/cm) | 0 | 120 | 163 | more than 200 | more than 200 |
| Surface resistivity (ω.cm) | $10^{10}$ | $10^9$ | $10^9$ | $10^9$ | $10^9$ |
| Appearance of package | packaging being impossible | good | good | good | good |

EXAMPLE 6

As the surface layer, the composition comprising 95% of a mixture of EPC/EBC (50/50 by weight) and 5% of low molecular weight polypropylene (molecular weight, 4000) as in Example 4 is employed. Preparation of a composite film is effected as in Example 1 but changing the thickness of the surface layer, the whole thickness of the composite film being 30 microns. The results are shown in Table 6.

TABLE 6

| Properties | Thickness of surface layer (μ) 0.4 | 0.6 | 1.0 | 2.0 |
|---|---|---|---|---|
| Transparency (%) | 92 | 92 | 93 | 92 |
| Gloss (%) | 97 | 99 | 98 | 96 |
| Haze value (%) | 4.4 | 4.3 | 4.8 | 5.3 |
| coefficient of friction at high temperature | 0.72 | 0.82 | 0.93 | 1.2 |
| Automatic suppliability | o | o | o | o |
| Degree of seal-packaging (150° C.) | B | B | A | B |
| Heat-seal strength (110° C.) (g/cm) | 24 | 53 | 75 | 90 |
| Surface resistivity (ω.cm) | $10^{11.3}$ | $10^{9.9}$ | $10^{9.3}$ | $10^{9.0}$ |
| Appearance of package | good | good | good | some scratches being present at sealed portion, appearance being good in practice |

EXAMPLE 7

Preparation of a composite film is effected using the same composition for the layer (B) as in Example 1 and the same composition for the layer (A) as in Example 1 but admixed with a varied amount of the petroleum resin as shown in Table 7. Using these films, package is effected, and the following properties are examined: automatic suppliability, sealability, adhesion-packaging ability and degree of bad packaging due to bad form of the tucked portion by the automatic packaging machine. The results are shown in Table 7.

TABLE 7

| Properties | Amount of petroleum resin (%) 0 | 20 | 10 | 20 | 30 | 50 |
|---|---|---|---|---|---|---|
| Transparency (%) | 93 | 95 | 94 | 93 | 90 | 87 |
| Gloss (%) | 94 | 95 | 99 | 105 | 90 | 85 |
| Haze value (%) | 4.7 | 4.7 | 4.8 | 4.7 | 5.8 | 6.2 |
| Automatic suppliability | o–Δ | o | o | o | Δ | x |
| Degree of seal-packaging (150° C.) | A | A | A | A | C | C |
| Surface resistivity (Ω.cm) | $10^{12.0}$ | $10^{10.0}$ | $10^{9.5}$ | $10^{9.3}$ | $10^{9.2}$ | $10^{9.2}$ |

When the amount of the petroleum resin is 0%, the automatic suppliability is decreased because antistatic property is somewhat reduced and the film is adsorbed to the guide plate or winds round the automatic cutter. When the content of the petroleum resin is high, heat generation is caused at the automatic cutter by the cutting of the film in case of operation for a long time, and the resin softened by heat accumulates to the cutting edge to cause insufficient cutting or pollution of the cut portion. As to the seal-packaging ability, thermal contraction of the film is apt to occur when the content of the petroleum resin is high, and the extent of cooling of the sealed portion is varied in each part, so that the film is not solidified in a flat form. Therefore, the heat-sealed portion becomes uneven, and the sealing degree is reduced because of the presence of gaps due to the unevenness.

The degree of adhesion-packaging indicates whether the product to be packaged is tightly packaged. By incorporating 2 to 20% of the petroleum resin, an adequate power of thermal contraction is produced at the heat sealed portion to obtain a beatiful heat sealed surface. In the heat sealed surface and its environs, a temperature gradient is formed under heating and becomes more notable in a remoter part from the seal surface, so that an adequate momentary contraction gives a good tension. When the content of the petroleum resin becomes larger, wave-like slackening of the film is caused from the sealed portion, and seal-packaging is not attained.

A bad package is sometimes caused by insufficient guiding of the film due to static electricity. This is observed particularly when the petroleum resin is not added. In case of the petroleum resin content being high, the bendability is improved, but insufficiency of lubricity, probably due to some bleeding-out by the stretching and thermal setting, and deformation of the film due to thermal contraction becomes notable to produce bad appearance and to cause unevenness of the sealed portion, so that commercial value is reduced.

EXAMPLE 8

To 100 parts of a polymer mixture comprising isotactic polypropylene (melt index, 4.5 g/10 min) and rosin ester in a weight ratio of 90:10, 1.0 part of polyethylene glycol monostearate (molecular weight of PEG, 600) is added to make a composition for the base layer (A). On the other hand, 92 parts of a mixture of ethylene-propylene copolymer (ethylene content, 5.0%) and ethylene-butene-1 copolymer (ethylene content, 5%) in a weight ratio of 1:1 is admixed with 8 parts of low molecular weight polypropylene (molecular weight, 1000), and 0.01 part of polyether-modified silicone and 0.1 part of erucic acid amide are incorporated therein to make a composition for the layer (B). These compositions are co-extruded, the layer (B) being piled on one surface of the layer (A), and the extruded product is stretched 4.5 fold in the machine direction at 130° C. and 8.5 fold in the transverse direction at 158° C.

The resultant film is a biaxially stretched composite film composed of the two layers (A)/(B) and having a thickness of 20 microns. This film is heat-set at 160° C. and subjected to corona discharge treatment on the surface of the layer (A) to obtain a wet tension of 42 dyne/cm.

Using the thus obtained composite film, package of slit-form dried laver is effected by the aid of an automatic packaging machine to examine the sealability.

For comparison, the films obtained in the following Comparative Examples are subjected to the same sealability test.

COMPARATIVE EXAMPLE 7

The composition for the layer (A) is the same as in Example 8. After stretching of the layer (A) in a machine direction, an ethylene-propylene copolymer (ethylene content, 5%) as the layer (B) is laminated thereon, and then transverse stretching, thermal setting and corona discharge treatment on the layer (A) are effected as in Example 8.

COMPARATIVE EXAMPLE 8

The composition for the layer (A) is the same as in Example 8. After stretching of the layer (A) in a machine direction, a propylene-butene-1 copolymer (propylene content, 70%) as the layer (B) is laminated on one surface of the layer (A), and the same treatments as in Comparative Example 7 are carried out. The results are shown in Table 8.

TABLE 8

| Film Properties | Example 8 | Comparative Example 7 | Comparative Example 8 |
|---|---|---|---|
| Transparency (%) | 93 | 92 | 85 |
| Gloss (%) | 95 | 94 | 85 |
| Haze value (%) | 2.8 | 2.8 | 7.9 |
| Automatic suppliability | o | o | o |
| Wrinkles at heat-sealed portion | | | |
| 120° C. | A | A | A |
| 135° C. | A | A | A |
| 150° C. | A | A | B |
| 165° C. | B | A | C |
| Degree of seal-packaging | | | |
| 120° C. | A | E | C |
| 135° C. | A | E | B |
| 150° C. | A | C | A |
| 165° C. | A | A | A |
| Heat-seal strength (g/cm) | | | |
| 120° C. | 70 | 2 | 30 |
| 135° C. | 160 | 15 | 50 |
| 150° C. | 190 | 110 | 196 |
| 165° C. | 260 | 360 | 280 |

When the obtained package is allowed to stand at 40° C. in a relative humidity of 80% for one month, the laver is moistened in case of the seal-packaging degree being low and adheres to the inside of the packaging material to cause a phenomenon of wetting, whereby black spots are seen in the film, and the taste of the laver is deteriorated to reduce the commercial value. In this test, the best results are obtained with the film of Example 5. With the film of Comparative Example 7, package at 120° to 135° C. affords bad results, and a sealed package can be obtained only at a higher temperature. The film of Comparative Example 8 can afford a sealed package. But the appropriate conditions are limited to a narrow range, and heat-sealing at high temperature is necessitated. Further, the haze value and the gloss are insufficient, and the apparent color of the laver becomes changed, only the sealed portion being transparent. Thus, the commercial value is greatly reduced.

EXAMPLE 9

The layer (A) of a composite film as in Example 8 is subjected to gravure printing after corona discharge treatment. An isocyanate adhesive agent is applied thereto, and the layer (A) of another compositte film is piled thereon, whereby a composite film having the layer (B) on each surface and being heat-sealable on both surfaces is obtained. Since a printed surface is sandwiched, the printing has a gloss and is not eliminated by rubbing.

EXAMPLE 10

A composition for the base layer (A) comprising isotactic polypropylene (melt index, 4.0 g/10 min; ethylene content, 0.5%) incorporated with stearyl monoglyceride and polyoxyethylene stearylamine respectively in concentrations of 0.5% and 0.1% is melt extruded to make an unstretched film, which is then stretched in 4.8 folds in a machine direction at 135° C. Separately, 95 parts of a mixture of ethylene-propylene copolymer (ethylene content, 4.2%) and ethylene-butene-1 copolymer (ethylene content, 3%), in a weight ratio of 70:30 and 5 parts of glycerol ester of hydrogenated rosin are mixed together, and 0.2 part of oleylamide, 0.3 part of stearyl monoglyceride and 0.3 part of calcium carbonate (particle size in average, 0.5 micron)

are incorporated therein. The resultant composition for the layer (B) is melt extruded onto the stretched film made of the composition for the base layer (A) as above, and the resultant laminated film is stretched in 8.3 folds in a transverse direction at 155° C., heat set at 160° C. for 10 seconds and subjected to corona discharge treatment to give a wetting tension of 43 dyne/cm. The thus obtained composite film has a thickness of 40 microns, the thickness of the base layer (A) and the layer (B) being respectively 37 microns and 3 microns.

The degree of seal-packaging of the composite film as obtained above is compared with that of the film (thickness, 40 microns) as obtained in Comparative Example 7. Packaging is effected at a rate of 60 packages per minute with different temperatures. The results are shown in Table 9.

TABLE 9

| Seal-packaging degree | Example 10 | Comparative Example 7 |
|---|---|---|
| 170° C. | B | D |
| 190° C. | A | C |
| 210° C. | A | B |

EXAMPLE 11

As in Example 1 but using propylene-butene-1 copolymer (melt index, 4.0 g/10 min; propylene content, 5%) in place of ethylene-butene-1 copolymer, there is prepared a biaxially stretched composite film having a thickness of 22 microns. The film is subjected to thermal setting and then corona discharge treatment on one of the layers (B) to make a wetting tension of 37 dyne/cm. After printing on such surface, the film is cut in a width of 120 mm. The seal-packaging test is effected by the use of an automatic packaging machine type W-37 (manufactured by Tokyo Jidosha K.K.). The results are as follows:
Transparency: 96%
Gloss: 125%
Haze value: 2.5
coefficient of friction:
    Between films: 0.42
    Between film and metal: 0.16
coefficient of friction at high temperature: 0.73
Degree of seal-packaging (150° C.): A
Heat-seal strength:
    120° C.: 80 g/cm
    135° C.: 170 g/cm
    150° C.: 180 g/cm
    160° C.: 200 g/cm
Surface resistivity: $10^{10.3}$ Ω.cm
Appearance of package: good

EXAMPLE 12

As in Example 2 but varying the rosin ester (glyceryl ester of hydrogenated rosin) content, there is prepared a biaxially stretched composite film having a thickness of 35 microns. The film is subjected to corona discharge treatment on its both surfaces to give a wet tension of 39 dyne/cm on one surface and a wet tension of 33 dyne/cm on the other surface. Sealing is effected on the surface having a wet tension of 39 dyne/cm, and characteristics as determined are shown in FIG. 1 of the accompanying drawings wherein the curve 1 indicates the relationship of the gloss with the rosin ester content, the curve 2 indicates the relationship of the heat-seal strength (heat-seal temperature, 120° C.; temperature at which the heat-seal strength is measured, room temperature) with the rosin ester content and the curve 3 indicates the relationship of the heat-seal strength (heat-seal temperature, 120° C.; temperature at which the heat-seal strength is measured, 85° C.). "B" represents that blocking is produced in the film.

From the results in FIG. 1, it is understood that the gloss and the heat sealability at low temperature (120° C.) are improved with the increase of the rosin ester content to a certain extent. However, the excessive increase results in production of blocking and lowering of heat sealability particularly at higher temperatures.

EXAMPLE 13

As in Example 2, there is prepared a biaxially stretched composite film. After heat-setting, the film is subjected to corona discharge treatment with a varied electricity to give a different wet tension. The relationship between the intrinsic resistance at the surface and the wet tension on the film obtained in Example 13 is represented by the curve 1 in FIG. 2. In FIG. 2, there is also shown the relationship between the heat-seal strength and the wet tension on the film of Example 13 (Curve 2), the film of Comparative Example 4 (Curve 3) and the film of Comparative Example 6 (Curve 4).

As understood from the results shown in FIG. 2, heat sealability is lowered by corona discharge in case of Comparative Examples. As to the film of the invention, the heat-seal strength is somewhat lowered around 36 dyne/cm, but the sealability is recovered at higher wetting tension. With elevation of the extent of corona discharge treatment, the intrinsic resistance at surface is lowered, and good antistatic property is produced without lowering the heat sealability.

EXAMPLE 14

As in Example 2 but varying the ethylene content in the ethylene/propylene copolymer for the layer (B), there is prepared a composite film. The heat-seal strength at the surface subjected to corona discharge treatment is shown in FIG. 3. Wetting tension is 38 dyne/cm. As understood from the results as given, lowering of the heat-seal strength is extremely small even if the surface treatment is carried out when the ethylene content exceeds 3.5%.

EXAMPLE 15

As in Example 1 but varying the silicone oil content in the composition for the layer (B), there is prepared a composite film. Various characteristics are measured on such film, and the results are shown in FIG. 4 wherein the curve 1 indicates the relationship of the haze value with the silicone oil content, the curve 2 indicates the relationship of the heat-seal strength with the silicone oil content and the curve 3 indicates the relationship of the coefficient of friction at high temperature with the silicone oil content. From the results as shown, it is understood that the scope as specified in the invention is satisfactory in coefficient of friction at high temperature, heat-seal strength, haze value, etc.

What is claimed is:
1. A packaging material having excellent heat seal packaging properties, which comprises (A) a base layer consisting of a stretched film made of a polymer composition comprising (a-1) a propylene polymer and (B) a surface layer consisting of a stretched film made of a polymeric mixture comprising a polymer blend provided on at least one surface of said base layer, said polymer blend comprising (b-1) a copolymer of ethylene and propylene having an ethylene content of 10 to 0.5% by weight and a propylene content of 90 to 99.5% by weight and (b-2) a copolymer of butene and another polymerizable monomer having ethylenic unsaturation having a butene content of 70 to 99% by weight and the other polymerizable monomer content of 30 to 1% by weight, (b-1) and (b-2) being combined in a weight proportion of 5:95 to 95:5; the total thickness of (B) being 0.2 to 50% of the total thickness of (A) and (B).

2. A packaging material having excellent heat seal packaging properties, which comprises (A) a base layer consisting of a stretched film made of a polymer composition comprising (a-1) a propylene polymer and (B) a surface layer consisting of a stretched film made of a polymeric mixture comprising a polymer blend provided on at least one surface of said base layer, said polymer blend comprising (b-1) a copolymer of ethylene and propylene having an ethylene content of 10 to 0.5% by weight and a propylene content of 90 to 99.5% by weight and (b-2) a copolymer of butene and another polymerizable monomer having ethylenic unsaturation having a butene content of 70 to 99% by weight and the other polymerizable monomer content of 30 to 1% by weight, (b-1) and (b-2) being combined in a weight proportion of 82:18 to 95:5; the total thickness of (B) being 0.2 to 50% of the total thickness of (A) and (B).

3. The packaging material according to claim 2, wherein the polymer composition of (A) further comprises a low molecular weight thermoplastic resin in an amount of 2 to 20 parts by weight to 100 parts by weight of the combined amount of the propylene polymer (a-1) and the low molecular weight thermoplastic resin.

4. The packaging material according to claim 2, wherein the polymer composition of (A) further comprises a lubricant and/or an anti-blocking agent in an amount of 0.1 to 3 parts by weight to 100 parts by weight of the combined amount of the propylene polymer (a-1) and the polymeric mixture of (B) further comprises a lubricant and/or an anti-blocking agent in an amount of 0.1 to 3 parts by weight to 100 parts by weight of the combined amount of the copolymer (b-1) and the copolymer (b-2).

5. The packaging material according to claim 2, wherein the polymeric mixture of (B) further comprises a silicone oil in an amount of 0.01 to 0.15 part by weight to 100 parts by weight of the combined amount of the copolymer (b-1) and the copolymer (b-2).

6. The packaging material according to claim 2, wherein the copolymer (b-1) has an ethylene content of 10 to 3.6% by weight and a propylene content of 90 to 96.4% by weight.

7. The packaging material according to claim 2, wherein at least one surface layer is subjected to electro-discharge treatment so as to have a wetting tension at that surface of 30.5 to 36 dyne/cm.

8. The packaging material according to claim 2, wherein at least one surface layer has a wetting tension at that surface of more than 36 dyne/cm.

9. The packaging material according to claim 2, wherein at least one surface layer has a thickness of 0.2 to 3 microns.

10. The packaging material according to claim 2, wherein at least one surface layer has a thickness of 0.7 to 10 microns.

11. The packaging material according to claim 2, wherein the polymer composition of (A) further comprises an antistatic agent in an amount of 0.1 to 3 parts by weight to 100 parts by weight of the propylene polymer (a-1).

12. The packaging material according to claim 11, wherein the polymeric mixture of (B) further comprises an antistatic agent in an amount of 0.1 to 3 parts by weight to 100 parts by weight of the combined amount of the copolymer (b-1) and the copolymer (b-2).

13. The packaging material according to claim 2, wherein the other polymerizable monomer in the copolymer (b-2) has not more than 10 carbon atoms.

14. The packaging material according to claim 13, wherein the other polymerizable monomer is ethylene or propylene.

15. A packaging material having excellent heat seal packaging properties, which comprises (A) a base layer consisting of a stretched film made of a polymer composition comprising (a-1) a propylene polymer and (B) a surface consisting of a stretched film made of a polymeric mixture comprising a polymer blend and a low molecular weight thermoplastic resin in a weight proportion of 75:25 to 97:3 provided on at least one surface of said base layer, said polymer blend comprising (b-1) a copolymer of ethylene and propylene having an ethylene content of 10 to 0.5% by weight and a propylene content of 90 to 99.5% by weight and (b-2) a copolymer of butene and another polymerizable monomer having ethylenic unsaturation having a butene content of 70 to 99% by weight and the other polymerizable monomer content of 30 to 1% by weight, (b-1) and (b-2) being combined in a weight proportion of 5:95 to 95:5; the total thickness of (B) being 0.2 to 50% of the total thickness of (A) and (B).

16. The packaging material according to claim 15, wherein the polymer composition of (A) further comprises a lubricant and/or an anti-blocking agent in an amount of 0.1 to 3 parts by weight to 100 parts by weight of the combined amount of the propylene polymer (a-1) and the polymeric mixture of (B) further comprises a lubricant and/or an anti-blocking agent in an amount of 0.1 to 3 parts by weight to 100 parts by weight of the combined amount of the copolymer (b-1) and the copolymer (b-2).

17. The packaging material according to claim 15, wherein the polymeric mixture of (B) further comprises a silicone oil in an amount of 0.01 to 0.15 part by weight to 100 parts by weight of the combined amount of the copolymer (b-1) and the copolymer (b-2).

18. The packaging material according to claim 15, wherein the copolymer (b-1) has an ethylene content of 10 to 3.6% by weight and a propylene content of 90 to 96.4% by weight.

19. The packaging material according to claim 15, wherein the low molecular weight thermoplastic resin is a member selected from the group consisting of hydrocarbon resins, rosins, dammars and phenol resins.

20. The packaging material according to claim 15, wherein at least one surface layer (B) is subjected to electro-discharge treatment so as to have a wetting tension at that surface of 30.5 to 36 dyne/cm.

21. The packaging material according to claim 15, wherein at least one surface layer (B) has a wetting tension at that surface of more than 36 dyne/cm.

22. The packaging material according to claim 15, wherein at least one surface layer (B) has a thickness of 0.2 to 3 microns.

23. The packaging material according to claim 15, wherein at least one surface layer (B) has a thickness of 0.7 to 10 microns.

24. The packaging material according to claim 15, wherein the polymer composition of (A) further comprises a low molecular weight thermoplastic resin in an amount of 2 to 20 parts by weight to 100 parts by weight of the combined amount of the propylene polymer (a-1) and the low molecular weight thermoplastic resin and in addition comprises an antistatic agent in an amount of 0.1 to 3 parts by weight to 100 parts by weight of the combined weight of the propylene polymer (a-1) and the low molecular weight thermoplastic resin.

25. The packaging material according to claim 24, wherein the polymeric mixture of (B) further comprises an antistatic agent in an amount of 0.1 to 3 parts by weight to 100 parts by weight of the combined amount of the copolymer (b-1) and the copolymer (b-2).

26. The packaging material according to claim 15, wherein the other polymerizable monomer in the copolymer (b-2) has not more than 10 carbon atoms.

27. The packaging material according to claim 26, wherein the other polymerizable monomer is ethylene or propylene.

28. A process for preparing a packaging material having excellent heat seal packaging properties, which comprises stretching an unstretched composite film in the machine direction and then stretching the stretched film in a direction substantially perpendicular to said machine direction, said unstretched composite film comprising (A) a base layer made of a polymer composition comprising (a-1) a propylene polymer and (B) a surface layer made of a polymeric mixture comprising a polymer blend provided on at least one surface of said base layer, said polymer blend comprising (b-1) a copolymer of ethylene and propylene having an ethylene content of 10 to 0.5% by weight and a propylene content of 90 to 99.5% by weight and (b-2) a copolymer of butene and an other polymerizable monomer having ethylenic unsaturation having a butene content of 70 to 99% by weight and the other polymerizable monomer content of 30 to 1% by weight, (b-1) and (b-2) being combined in a weight proportion of 5:95 to 95:5; the total thickness of (B) being 0.2 to 50% of the total thickness of (A) and (B).

29. The process according to claim 28, wherein in (B) the weight proportion of the copolymer (b-1) and the copolymer (b-2) is 82:18 to 95:5.

30. The process according to claim 28, wherein the polymer composition of A further comprises a lubricant and/or an anti-blocking agent in an amount of 0.1 to 3 parts by weight to 100 parts by weight of the combined amount of the propylene polymer (a-1) and the polymeric mixture of B further comprises a lubricant and/or an anti-blocking agent in an amount of 0.1 to 3 parts by weight to 100 parts by weight of the combined amount of the copolymer (b-1) and the copolymer (b-2).

31. The process according to claim 28, wherein the copolymer (b-1) has an ethylene content of 10 to 3.6% by weight and a propylene content of 90 to 96.4% by weight.

32. The process according to claim 28, wherein at least one surface layer (B) is subjected to electro-discharge treatment so as to have a wetting tension at that surface of 30.5 to 36 dyne/cm.

33. The process according to claim 28, wherein at least one surface layer (B) has a wetting tension at that surface of more than 36 dyne/cm.

34. The process according to claim 28, wherein the polymeric mixture of (B) further comprises a low molecular weight thermoplastic resin in an amount of 3 to 25 parts by weight to 100 parts of the combined amount of the polymer blend and the thermoplastic resin.

35. The process according to claim 34, wherein the low molecular weight thermoplastic resin is a member selected from the group consisting of hydrocarbon resins, rosins, dammars and phenol resins.

36. The process according to claim 28, wherein the polymer composition of A further comprises an antistatic agent in an amount of 0.1 to 3 parts by weight to 100 parts by weight of the propylene polymer (a-1).

37. The process according to claim 36, wherein the polymeric mixture of B further comprises an antistatic agent in an amount of 0.1 to 3 parts by weight to 100 parts by weight of the combined amount of the copolymer (b-1) and the copolymer (b-2).

38. The process according to claim 28, wherein the other polymerizable monomer in the copolymer (b-2) has not more than 10 carbon atoms.

39. The process according to claim 38, wherein the other polymerizable monomer is ethylene or propylene.

40. A process for preparing a packaging material having excellent heat seal packaging properties, which comprises stretching a composite film comprising (A) a base layer consisting of a uniaxially stretched film made of a polymer composition comprising (a-1) a propylene polymer and (B) a surface layer consisting of an unstretched film made of a polymeric mixture comprising a polymer blend provided on at least one surface of said base layer in a direction substantially perpendicular to the direction in which the uniaxially stretched film has been stretched, said polymer blend comprising (b-1) a copolymer of ethylene and propylene having an ethylene content of 10 to 0.5% by weight and a propylene content of 90 to 99.5% by weight and (b-2) a copolymer of butene and another polymerizable monomer having ethylenic unsaturation, having a butene content of 70 to 99% by weight and the other polymerizable monomer content of 30 to 1% by weight, (b-1) and (b-2) being combined in a weight proportion of 5:95 to 95:5; the total thickness of (B) being 0.2 to 50% of the total thickness of (A) and (B).

41. The process according to claim 40, wherein in (B) the weight proportion of the copolymer (b-1) and the copolymer (b-2) is 82:18 to 95:5.

42. The process according to claim 40, wherein the polymer composition of (A) further comprises a lubricant and/or an anti-blocking agent in an amount of 0.1 to 3 parts by weight to 100 parts by weight of the combined amount of the propylene polymer (a-1) and the polymeric mixture of (B) further comprises a lubricant and/or an anti-blocking agent in an amount of 0.1 to 3 parts by weight to 100 parts by weight of the combined amount of the copolymer (b-1) and the copolymer (b-2).

43. The process according to claim 40, wherein the copolymer (b-1) has an ethylene content of 10 to 3.6% by weight and a propylene content of 90 to 96.4% by weight.

44. The process according to claim 40, wherein at least one surface layer (B) is subjected to electro-discharge treatment so as to have a wetting tension at that surface of 30.5 to 36 dyne/cm.

45. The process according to claim 40, wherein at least one surface layer (B) has a wetting tension at that surface of more than 36 dyne/cm.

46. The process according to claim 40, wherein the polymeric mixture of (B) further comprises a low molecular weight thermoplastic resin in an amount of 3 to 25 parts by weight to 100 parts of the combined amount of the polymer blend and the thermoplastic resin.

47. The process according to claim 46, wherein the low molecular weight thermoplastic resin is a member selected from the group consisting of hydrocarbon resins, rosins, dammars and phenol resins.

48. The process according to claim 40, wherein the polymer composition of (A) further comprises an antistatic agent in an amount of 0.1 to 3 parts by weight to 100 parts by weight of the propylene polymer (a-1).

49. The process according to claim 48, wherein the polymeric mixture of (B) further comprises an antistatic agent in an amount of 0.1 to 3 parts by weight to 100 parts by weight of the combined amount of the copolymer (b-1) and the copolymer (b-2).

50. The process according to claim 40, wherein the other polymerizable monomer in the copolymer (b-2) has not more than 10 carbon atoms.

51. The process according to claim 50, wherein the other polymerizable monomer is ethylene or propylene.

* * * * *